(12) United States Patent
Takahashi et al.

(10) Patent No.: US 9,032,459 B2
(45) Date of Patent: May 12, 2015

(54) CAMERA SYSTEM, SIGNAL DELAY AMOUNT ADJUSTING METHOD AND PROGRAM

(75) Inventors: Hiroaki Takahashi, Kanagawa (JP);
Tamotsu Munakata, Kanagawa (JP);
Hideaki Murayama, Kanagawa (JP);
Satoshi Tsubaki, Kanagawa (JP);
Eisaburo Itakura, Kanagawa (JP)

(73) Assignee: Sony Corporation (JP)

( * ) Notice: Subject to any disclaimer, the term of this patent is extended or adjusted under 35 U.S.C. 154(b) by 590 days.

(21) Appl. No.: 13/321,882

(22) PCT Filed: Mar. 24, 2011

(86) PCT No.: PCT/JP2011/001743
§ 371 (c)(1),
(2), (4) Date: Nov. 22, 2011

(87) PCT Pub. No.: WO2011/121952
PCT Pub. Date: Oct. 6, 2011

(65) Prior Publication Data
US 2012/0062755 A1   Mar. 15, 2012

(30) Foreign Application Priority Data
Mar. 31, 2010   (JP) ............................... P2010-082341

(51) Int. Cl.
*H04N 7/173*     (2011.01)
*H04N 5/247*     (2006.01)
*H04N 21/2187*   (2011.01)
*H04N 21/262*    (2011.01)
*H04N 5/232*     (2006.01)

(52) U.S. Cl.
CPC ........... *H04N 5/23203* (2013.01); *H04N 5/247* (2013.01); *H04N 21/2187* (2013.01); *H04N 21/2625* (2013.01)

(58) Field of Classification Search
USPC ................... 348/211.3, 211.4, 211.5, 211.11, 348/211.14; 725/105
See application file for complete search history.

(56) References Cited

U.S. PATENT DOCUMENTS

| | | | |
|---|---|---|---|
| 5,371,535 A | 12/1994 | Takizawa | |
| 7,436,456 B2 | 10/2008 | Morel et al. | |
| 7,903,694 B2 | 3/2011 | Defrance et al. | |
| 2002/0001041 A1* | 1/2002 | Sezaki | ........................ 348/385.1 |

(Continued)

FOREIGN PATENT DOCUMENTS

| | | | |
|---|---|---|---|
| EP | 1339182 A2 | 8/2003 | |
| EP | 1339182 A3 | 9/2005 | |

(Continued)

OTHER PUBLICATIONS

Office Action from Japanese Application No. 2010-082341, dated Jun. 10, 2014.

(Continued)

*Primary Examiner* — Hung Lam
(74) *Attorney, Agent, or Firm* — Lerner, David, Littenberg, Krumholz & Mentlik, LLP

(57) ABSTRACT

A system and method for adjusting one or more signal delays. The signal delays are adjusted by obtaining delay amounts of video signals associated with respective camera units and respective camera control units, the camera units being coupled to respective ones of the camera control units via an asynchronous network, and adjusting one or more of the delay amounts.

3 Claims, 8 Drawing Sheets

(56) References Cited

U.S. PATENT DOCUMENTS

| | | | |
|---|---|---|---|
| 2004/0257469 A1* | 12/2004 | Compton et al. | 348/500 |
| 2005/0206740 A1* | 9/2005 | Tanabe | 348/211.1 |
| 2006/0053459 A1* | 3/2006 | Simerly et al. | 725/105 |
| 2006/0136972 A1 | 6/2006 | Metzger et al. | |
| 2008/0111643 A1* | 5/2008 | Shen | 331/167 |
| 2009/0245267 A1* | 10/2009 | Igarashi et al. | 370/401 |
| 2013/0013342 A1* | 1/2013 | Morris | 705/3 |
| 2014/0119438 A1* | 5/2014 | Gonen et al. | 375/240.12 |

FOREIGN PATENT DOCUMENTS

| | | |
|---|---|---|
| EP | 2114053 A1 | 11/2009 |
| JP | 09-238277 A | 9/1997 |
| JP | 10322650 | 12/1998 |
| JP | 3261992 B2 | 3/2002 |
| JP | 2003052056 A | 2/2003 |
| JP | 2003-134080 A | 5/2003 |
| JP | 2004-304809 A | 10/2004 |
| JP | 2004-343697 A | 12/2004 |
| JP | 2006217326 A | 8/2006 |
| JP | 2006295854 A | 10/2006 |
| JP | 2007-312223 A | 11/2007 |
| JP | 2010-021935 A | 1/2010 |
| JP | 2010505362 A | 2/2010 |
| JP | 2010-062767 A | 3/2010 |

OTHER PUBLICATIONS

Office Action from Chinese Application No. 2011-80002166.1, dated Dec. 16, 2013.

Office Action from Japanese Application No. 2010-082341, dated Sep. 10, 2013.

Supplementary European Search Report from EP Application No. 11762204, dated Sep. 13, 2013.

* cited by examiner

CAMERA SYSTEM, SIGNAL DELAY AMOUNT ADJUSTING METHOD AND PROGRAM

CROSS-REFERENCE TO RELATED APPLICATION

The present application is a national phase entry under 35 U.S.C. §371 of International Application No. PCT/JP2011/001743 filed on Mar. 24, 2011, published on Oct. 6, 2011 as WO 2011/121952 A1, which claims priority from Japanese Patent Application No. JP 2010-082341 filed in the Japanese Patent Office on Mar. 31, 2010, the entire content of which is incorporated herein by reference.

TECHNICAL FIELD

The present invention relates to a camera system, a signal delay amount adjusting method and a program.

BACKGROUND ART

Patent Literature 1 below has disclosed, for example, a camera control apparatus capable of controlling a plurality of cameras by one unit thereof. Patent Literature 1 has disclosed a configuration in which a Camera Head Unit (CHU) and a Camera Control Unit (CCU) are connected via a camera cable on a one-to-one basis to transmit reference signals and video signals.

Further, Patent Literature 2 below has disclosed a method using an asynchronous switching network (an asynchronous transmission network) for transmitting between the CHU and the CCU.

CITATION LIST

Patent Literature

[PTL 1]
Japanese Unexamined Patent Application Publication No. 09-238277
[PTL 2]
Japanese Unexamined Patent Application Publication No. 2004-304809

SUMMARY

When a video transmission is performed using the asynchronous transmission network as described in the Patent Literature 2, a transmission path varies for each combination of each of the CHU and the CCU, and therefore, a delay amount will be varied. For this reason, it is necessary to align arrival timing of video signals in each of the CCU by adjusting timing. Especially, since a route path is not fixed on the asynchronous transmission network and the route path varies depending on the situation, it is difficult to adjust timing of the video signals.

Moreover, since a development of a camera system increases flexibility in case of the asynchronous transmission network, it is preferable that switching an asynchronous transmission wire such as a LAN cable, or a device such as a switching hub, a router, or the like, for example, can be flexibly accepted. In such case, adjusting timing of the video signals will be difficult.

Further, by using the asynchronous transmission network, when a failure occurs on the route path currently in use, there is an advantage in developing a redundant configuration against the failure on a transmission device by changing into a different route path, however, it is also necessary to adjust the timing of the video signals in a flexible way according to the change of the route path.

Further, due to a bandwidth limitation of the asynchronous transmission network, it is assumed that transmission may be performed after a video compression (encoding) in the CHU to compress (decoding) the compressed image in the CCU. In this case, it is necessary to consider a delay due to the encoding and decoding, accompanying with complicated processing for adjusting timing.

In light of the foregoing, it is desirable to provide a camera system, a signal delay amount adjusting method, and a program, which are novel and improved, and which are capable of easily adjusting timing of video signals when a plurality of cameras are connected via an asynchronous transmission network.

Accordingly, the present system and method for adjusting one or more signal delays is provided. In one embodiment, the signal delays are adjusted by obtaining delay amounts of video signals associated with respective camera units and respective camera control units, the camera units being coupled to respective ones of the camera control units via an asynchronous network, and adjusting one or more of the delay amounts.

DESCRIPTION OF EMBODIMENTS

Figure 1:
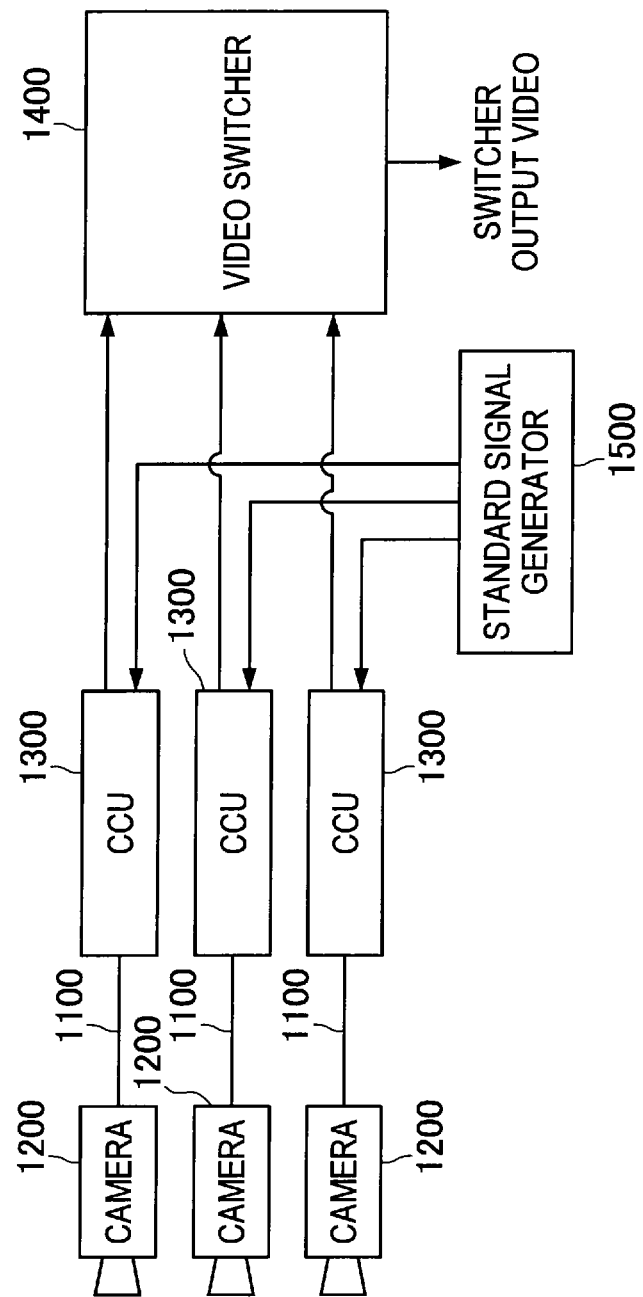
FIG. 1 is a block diagram for illustrating a camera control system in which a camera (CHU) and a CCU are connected in a one-to-one basis.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be given in the order shown below.
1. Technological Basis
2. Configuration Example of a Camera System According to the Present Embodiment
3. Procedure of a System According to the Present Embodiment

1. Technological Basis

FIG. 1 is a block diagram for illustrating a camera control system in which a camera and a CCU are connected in a one-to-one basis. This camera system is the one used in a studio of a TV station, or the like, in which a CHU 1200 and a CCU 1300 are connected via a camera cable 1100 on a one-to-one basis, and reference signals and video signals are transmitted. The camera system transmits/receives signals, such as video signals or return video signals, among a plurality of the CCU (Camera Control Unit) 1300 as a camera control apparatus, a plurality of the CHU (Camera Head Unit) 1200 connected to each of the CCU 1300 via the camera cable 1100, and the CCU 1300, and is configured from a video switcher 1400 for outputting video signals corresponding to the CHU 1200 and the CCU 1300 that have been selected, and a standard signal generator 1500 for outputting a standard signal that is a reference for establishing a video synchronization between each of the CHU 1200 and the CCU 1300.

The video switcher 1400 switches the video signals received from each of the CCU 1300 in accordance with selection to output. In order not to distort the video signals at a time of video switching, it is necessary that each of the video signals is synchronized, and that each of the CCU 1300 receives the video signals, which have been synchronized to the reference signal from the standard signal generator 1500, from the CHU 1200. The CCU 1300 transmits the reference signal from the standard signal generator 1500 to the CHU 1200, while the CHU 1200 transmits the video signals synchronized to the reference signal to the CCU 1300.

However, although the video signals are synchronized to the reference signal, a timing error occurs in the actual video signals arrived at the video switcher 1400 due to a factor, such as a transmission delay of the camera cable connecting the CHU 1200 and the CCU 1300, a delay in processing in the CCU 1300, or the like. Therefore, in an input stage of the video switcher 1400, a fine adjustment is to be performed for a transmitting timing of the video signals in the CHU 1200 so that the timing of each of the video signals from the each of the CCU 1300 can be matched. This assures an identity of input timings of the video signals transmitted from the CHU 1200, in the video switcher 1400.

The adjustment of the transmitting timing can be performed by a phase regulation in a PLL (Phase Locked Loop) of the CHU 1200 (camera). Performing a delay adjustment by the PLL phase regulation on the side of the camera realizes an adjustment of the input timing of the video signal at low cost and at low power consumption without creating a buffer for the timing adjustment of video data or audio data. However, in this method, range allowed to be delayed from a standard signal form is limited to within one field of the video signal. When a delay adjustment on the side of the CCU 1300 is performed, or when a delay adjustment is performed over one field, a delay adjustment using the buffer for video data and audio data is necessary.

As described above, FIG. 1 shows a configuration in which the CHU 1200 and the CCU 1300 are connected via the camera cable on a one-to-one basis, and reference signals and video signals are transmitted. In this configuration, since the factors, such as a transmission delay of the camera cable, the delay in processing in the CCU 1300, are resolved, it is necessary to perform the timing adjustment. On the other hand, as described before, there exists a method using the asynchronous transmission network for transmission between the CHU 1200 and the CCU 1300. In the asynchronous transmission network, each of the CCU 1300 and the CHU 1200 transmits the reference signal or the video signal on the same transmission network. In this case, as described before, as the route path is not fixed and the route path varies in accordance with situation, an amount of the timing adjustment of the signals is not to be uniquely defined. Therefore, there is a difficulty in the timing adjustment of the video signals and the audio signals. In light of the foregoing, the present embodiment is aimed to adjust optimally a timing of signals in a camera system using an asynchronous transmission network.

2. Configuration Example of a Camera System According to the Present Embodiment

Figure 2:
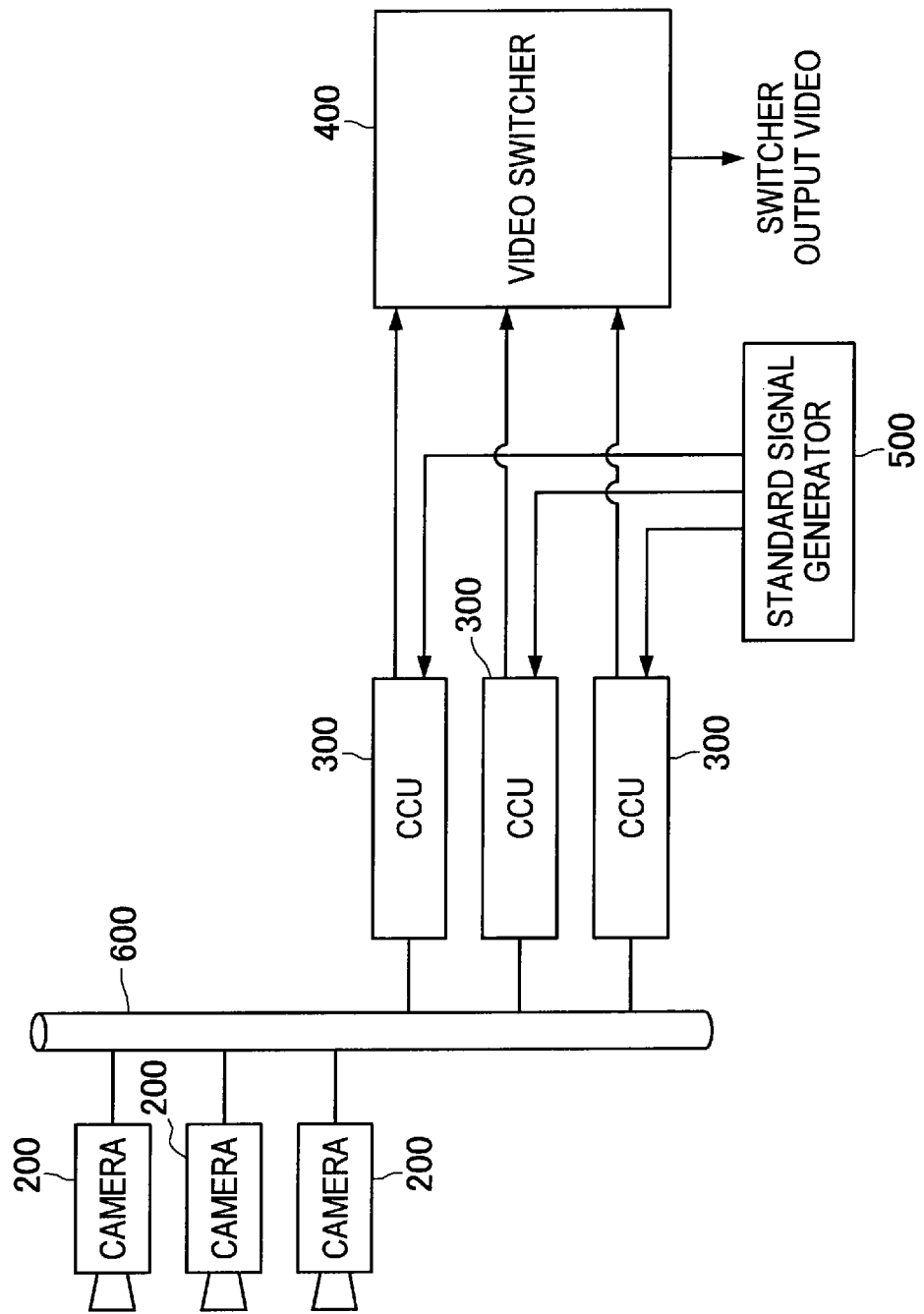
FIG. 2 is a schematic view for illustrating an example of a camera system using an asynchronous transmission network according to an embodiment of the present invention.

FIG. 2 is a schematic view for illustrating an example of a camera system using an asynchronous transmission network according to an embodiment. As FIG. 2 shows, a camera system 100 is configured from a plurality of a CHU (a camera unit) 200, a CCU (a camera control unit) 300, a video switcher 400, and a standard signal generator 500. The camera and the CCU are connected via an asynchronous transmission network 600. Note that the present embodiment exemplifies the Ethernet (a registered trademark) as the asynchronous transmission network 600, however it is not limited to this example.

When a video transmission is performed using the asynchronous transmission network, since a transmission path varies for each combination of each of the CHU 200 and the CCU 300, the delay amount will varies. In this case, it is also possible to align arrival timing of video signals in each of the CCU 300 by adjusting timing, similar to the configuration in FIG. 1 where the CHU 200 and the CCU 300 are connected in a one-to-one basis. However, a route path is not fixed on the asynchronous transmission network 600 and the route path may vary depending on the situation.

Moreover, in perspective of increasing flexibility in the development of the camera system 100, it is desired that switching an asynchronous transmission wire such as a LAN cable, or a device such as a switching hub, a router, or the like, for example, can be flexibly accepted. In this case, the individual adjusting timing as described in FIG. 1 will be difficult to be dealt with.

Further, by using the asynchronous transmission network 600, when a failure occurs on the route path currently in use, there is an advantage in developing a redundant configuration against the failure on a transmission device by changing into a different route path. In such a case, it is also difficult to deal with the individual adjusting timing as explained in FIG. 1.

Further, due to a bandwidth limitation of the asynchronous transmission network, it is assumed that transmission may be performed after a video compression (encoding) in the CHU 200, and the compressed image is to be decompressed (decoding) in the CCU 300. In this case, it is necessary to take into consideration a delay due to the encoding and decoding, after all, dealing with the individual adjusting timing is associated with difficulties.

For the reasons described above, a timing adjustment system of the CHU-CCU which is capable of coping flexibly with configuration changes of the camera system 100 is desired in the CHU-CCU camera system which is configured on the asynchronous transmission network 600.

Figure 3:
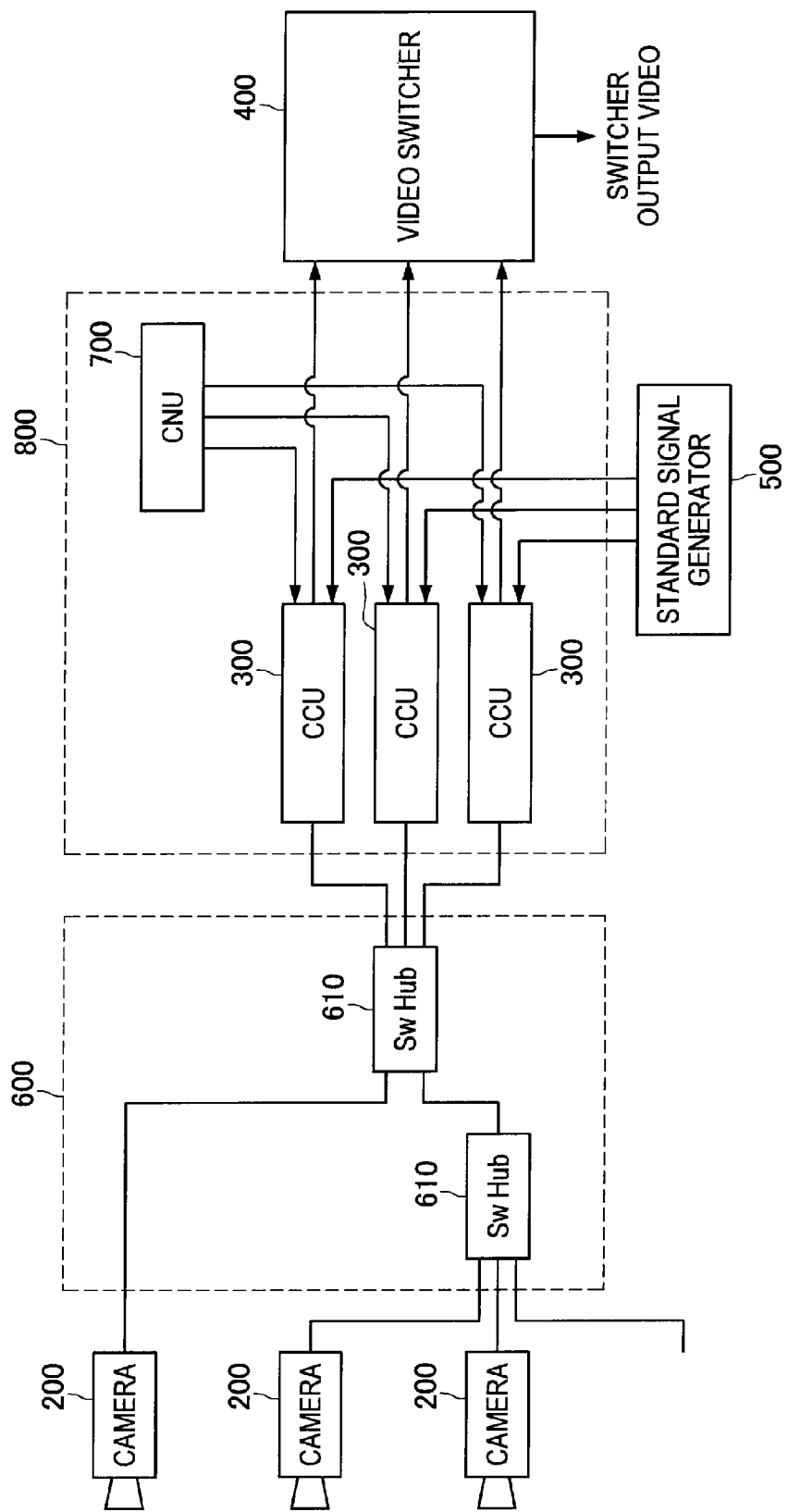
FIG. 3 is a schematic view for illustrating the system illustrated in FIG. 2 in more detail.

FIG. 3 is a schematic view for illustrating the system illustrated in FIG. 2 in more detail. FIG. 2 exemplifies the Ethernet (a registered trademark) as the asynchronous transmission network, however, it is not limited to the Ethernet (a registered trademark). The asynchronous transmission network 600 includes a plurality of a switching hub 610. A plurality of the CHU 200 and a plurality of the CCU 300 are configured so as to correspond with each other on a one-to-one basis, by setting IP address appropriately, for example. Moreover, the reference signal from the standard signal generator 500 is to be transmitted from the CCU 300 to the CHU 200 using the method described in the Patent Literature 2 above or a method of the IEEE1588, or the like. This enables a measurement of the transmission the delay amount between the CHU 200 and the CCU 300.

The configuration shown in FIG. 3 includes a CNU (camera command network unit) 700 in order to adjust a signal delay amount. The CNU 700 has a function for adjusting the signal delay amount. As described later, it is possible not to have the CNU 700, but to set a certain CCU 300 as a master device so that the CCU 300 of the master device is to adjust the delay amount.

In the system shown in FIG. 3, a structural element 800 which has functions of the CCU 300 and the CNU 700 can be configured by a central processing unit, such as a circuit (hardware) or a CPU, or the like, and a program (software) to function the central processing unit. In this case, the program may be stored in a recording medium, such as a memory included with a structural element such as the CCU 300 or the like, or a memory that is inserted externally, or the like.

Figure 4:
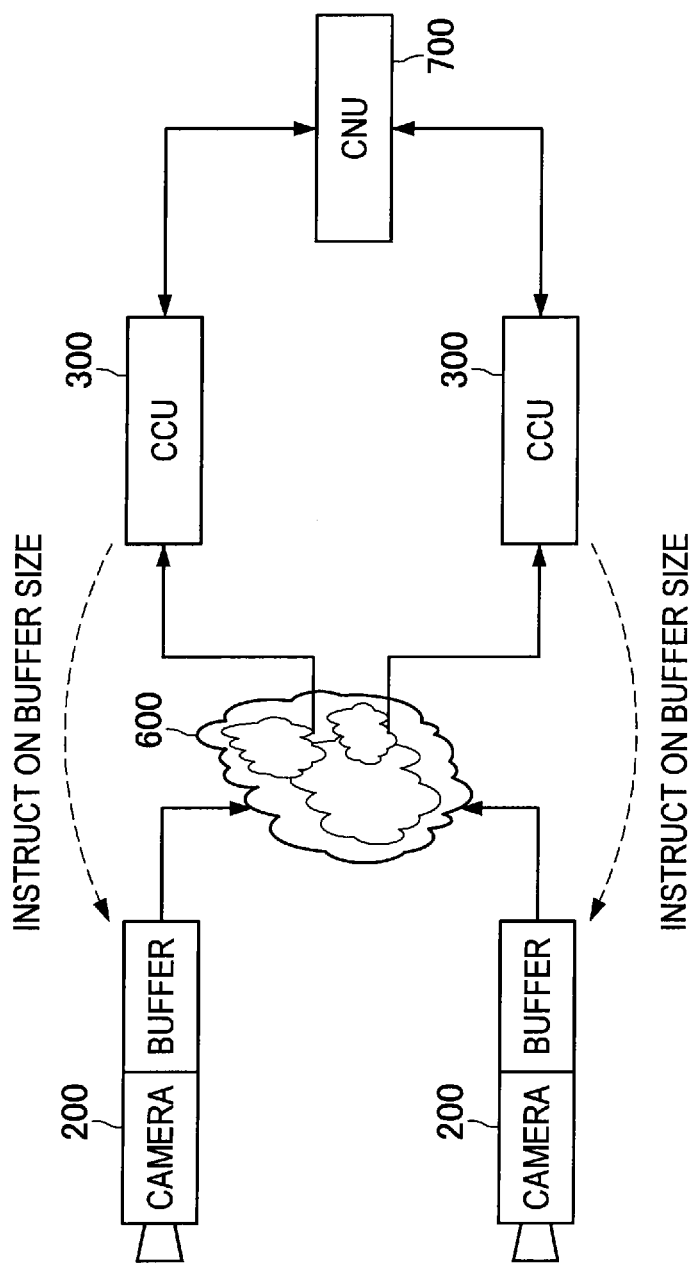
FIG. 4 is a schematic view for illustrating a configuration for adjusting a delay amount in detail.
Figure 5:
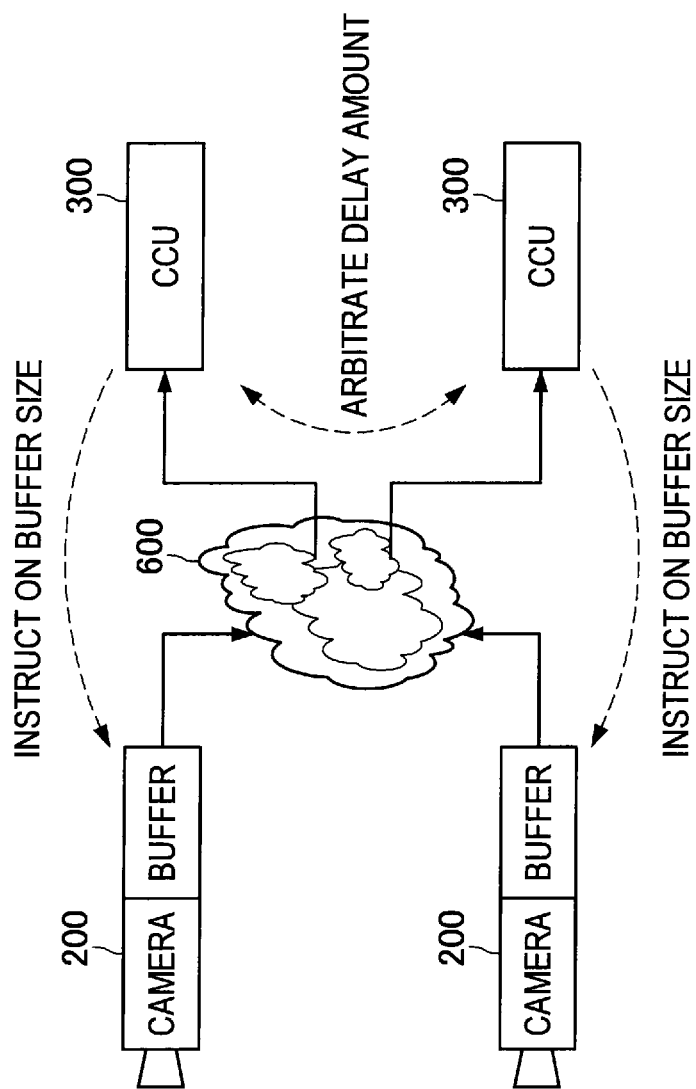
FIG. 5 is a schematic view for illustrating a configuration for adjusting a delay amount in detail.

FIG. 4 and FIG. 5 are schematic views for illustrating a configuration for adjusting the delay amount in detail. A configuration shown in FIG. 4 corresponds to the configuration in FIG. 3, and separately mounts the CNU (camera command network unit) 700 for adjusting the delay amount. The delay amount between the corresponding CHU 200 and the CCU 300 is to be informed from the CCU 300 to CNU 700. The CNU 700 arbitrates the delay amount to determine the optimal delay amount. The determined delay amount is to be informed through the CCU 300 to the CHU 200, and the CHU 200 sets up with a video buffer accordingly in order to align timing of video signals reached at each of the CCU 300.

The concrete method to determine the delay amount will be explained in detail based on FIG. 8 later. Note that the CNU 700 is used for the arbitration here, however, another structural element can be used as a device for arbitration in place of the CNU 700.

FIG. 5 shows a configuration in which any of the CCU 300 functions as a master device to arbitrate the delay amount without having the CNU 700. As described above, a certain CCU 300 may be configured to perform function of arbitration without mounting newly an additional device for arbitration.

As a concrete method to determine the delay amount, there is a method for adjusting the video buffer so that, with respect to the pair of the CHU 200 and the CCU 300 whose delay is the largest, the delay amount of another pair of the CHU 200 and the CCU 300 to be the same. Moreover, based on the delay amount of a certain pair of the CHU 200 and the CCU 300 that is a main camera as a reference, adjustments can be made on video images so that the delay amount of another pair of the CHU 200 and the CCU 300 becomes the same.

Here, if a reference delay time is Tb, there may be cases such as when the delay amount is less than the reference delay time Tb (the delay amount in this case is assumed as Ts), or when the delay amount is larger than the reference delay time Tb (the delay time in this case is assumed as Tl), depending on a pair of the CHU 200 and the CCU 300.

In the present embodiment, with regard to the reference delay time Tb of the CHU 200, adjustments are made on the delay time of another CHU 200. At this time, as described below, adjustments are made on the delay time so that start timings of frames of the video images are matched with each other.

Firstly, when the delay amount is less than the reference delay time Tb (the delay amount=Ts), the CCU 300 instructs the CHU 200 to create a video buffer for time Tb−Ts, and adjusts the delay amount of the video image reached at the CCU 300 to be equal to Tb.

Figure 6:
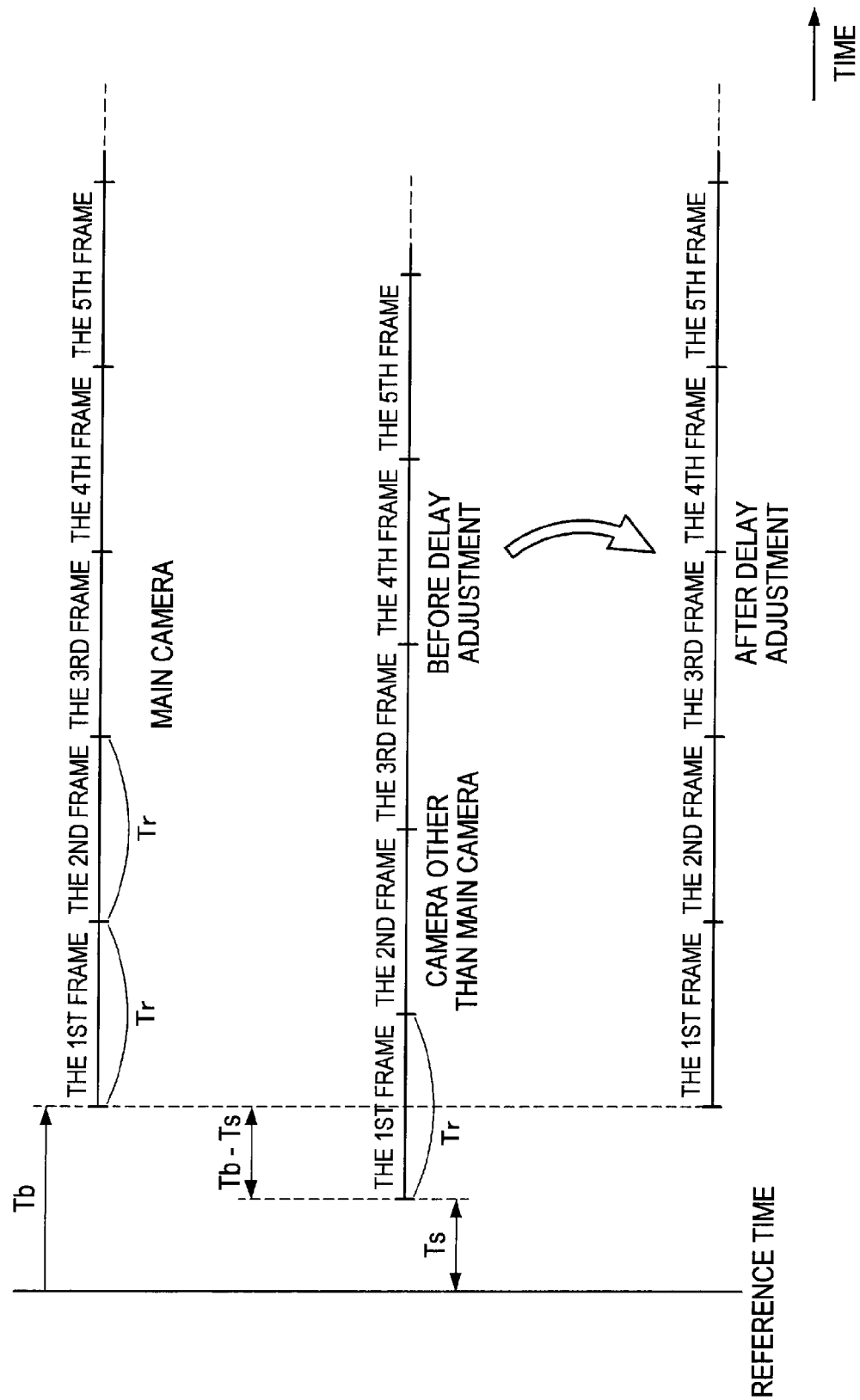
FIG. 6 is a schematic view for illustrating a case where a delay amount Ts of a certain CHU other than a main camera is less than a reference delay time Tb.

FIG. 6 shows a case where the delay amount Ts of a certain CHU 200 other than the main camera is less than the reference delay time Tb. In this case, as shown FIG. 6, video signals of the main camera (the first frame to the fifth frame and more) are delayed for the reference delay time Tb from the reference time. Further, video signals of an arbitrary camera other than the main camera (the first frame to the fifth frame and more) are delayed for Ts (Tb>Ts) from the reference time before delay adjustment. In this case, a video buffer is to be created for time Tb−Ts. Accordingly, as shown in a diagram of a delay amount after adjustment illustrated in the bottom of FIG. 6, the delay amount of the video signal of the main camera becomes coincident with the delay amount of the video signal after delay amount adjustment of an arbitrary camera other than the main camera, and a start time of each frame is matched with each other. Therefore, it is possible to surely avoid distortion of the video images at a time of switching the signals by the video switcher.

Figure 7:
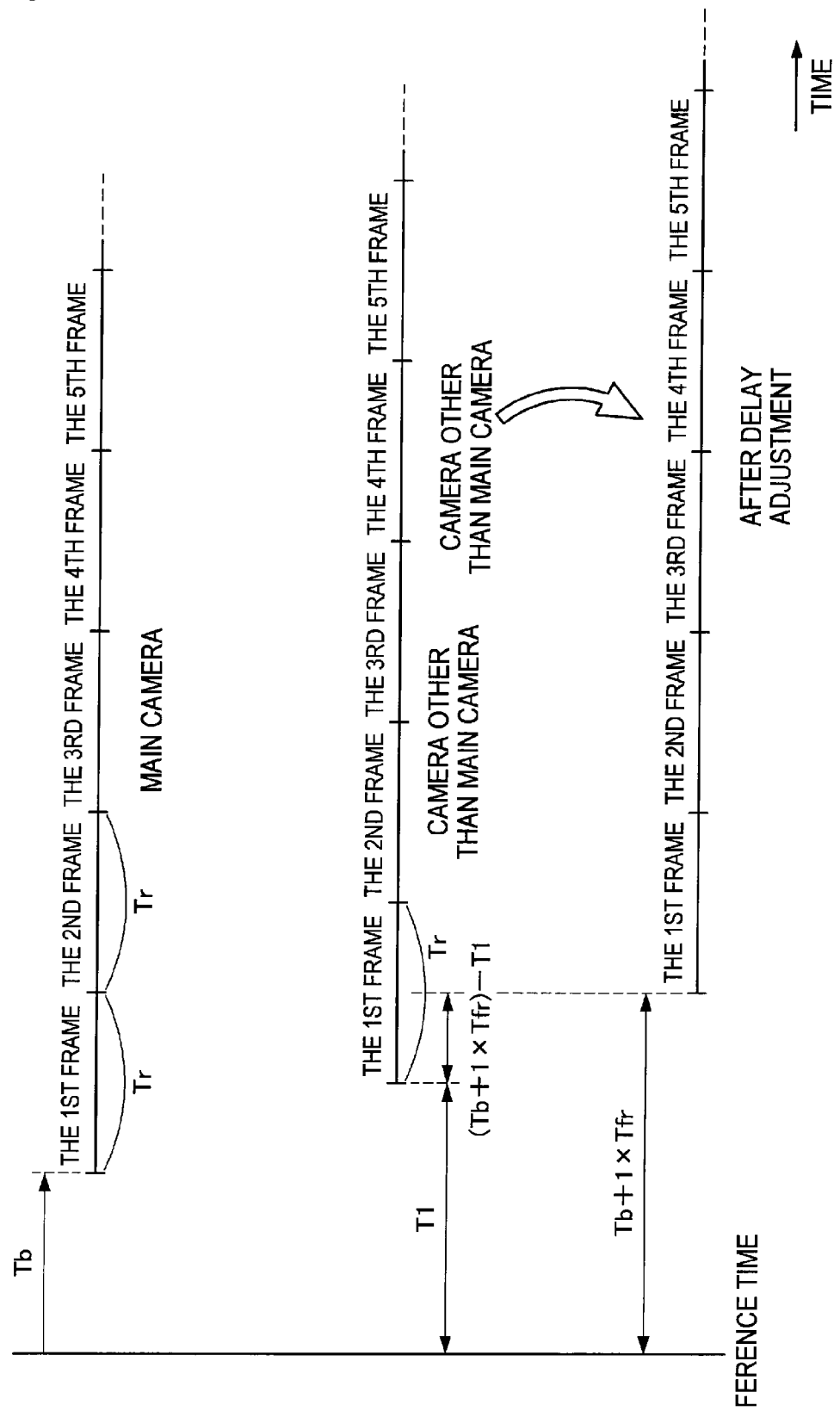
FIG. 7 is a schematic view for illustrating a case where a delay amount Tl of a certain CHU other than a main camera is larger than a reference delay time Tb.

Further, FIG. 7 shows a case where a delay amount Tl of a certain CHU other than the main camera is larger than the reference delay time Tb. In this case, as shown FIG. 7, video signals of the main camera (the first frame to the fifth frame and more) are delayed for the reference delay time Tb from the reference time. Further, video signals of an arbitrary camera other than the main camera (the first frame to the fifth frame and more) are delayed for Tl (Tl>Tb) from the reference time before delay adjustment. In this case, a video buffer is to be created for time (Tb+n*Tfr)−Tl. Here, Tfr is time for 1 frame, and n is to be defined so as to be (Tb+n*Tfr)−Tl. In FIG. 7, n=1 is to be set. Accordingly, as shown in a diagram of a delay amount after adjustment in the bottom of FIG. 7, although a certain frame of the video signal of the main camera is shifted for one frame from the corresponding frame of the video signal of a certain camera other than the main camera, the start time of each frame is matched with each other. Therefore, it is possible to surely avoid distortion of the video images at a time of switching the signals by the video switcher. Note that in FIG. 7, it is assumed that n=1 since the start time of the first frame of cameras other than the main camera is earlier than the start time of the second frame of the main camera, however, if the start time of the first frame of cameras other than the main camera is later than the start time of the second frame of the main camera and earlier than the start time of the third frame of the main camera, it is assumed that n=2. Accordingly, although a certain frame of the video signal of the main camera is shifted for two frames from the corresponding frame of the video signal of a certain camera other than the main camera, the start time of each frame is matched with each other, and so it is possible to avoid distortion of the video images.

As described above, if the delay amount (Tl) is larger than the reference delay time Tb, the CCU 300 instructs the CHU 200 to create a video buffer for time (Tb+n*Tfr)−Tl, and adjusts so that the delay amount of the video reached at the CCU 300 is delayed for n frames from the reference delay Tb.

Further, regarding the CHU 200, the CCU 300, the CNU 700 or the video switcher 400 or the like, which are delayed for n-frames from the pair as a reference of the CHU 200 and the CCU 300, there is a function to display that a pair of the CHU 200 and the CCU 300 is delayed for n-frames.

3. Procedure of a System According to the Present Embodiment

Figure 8:
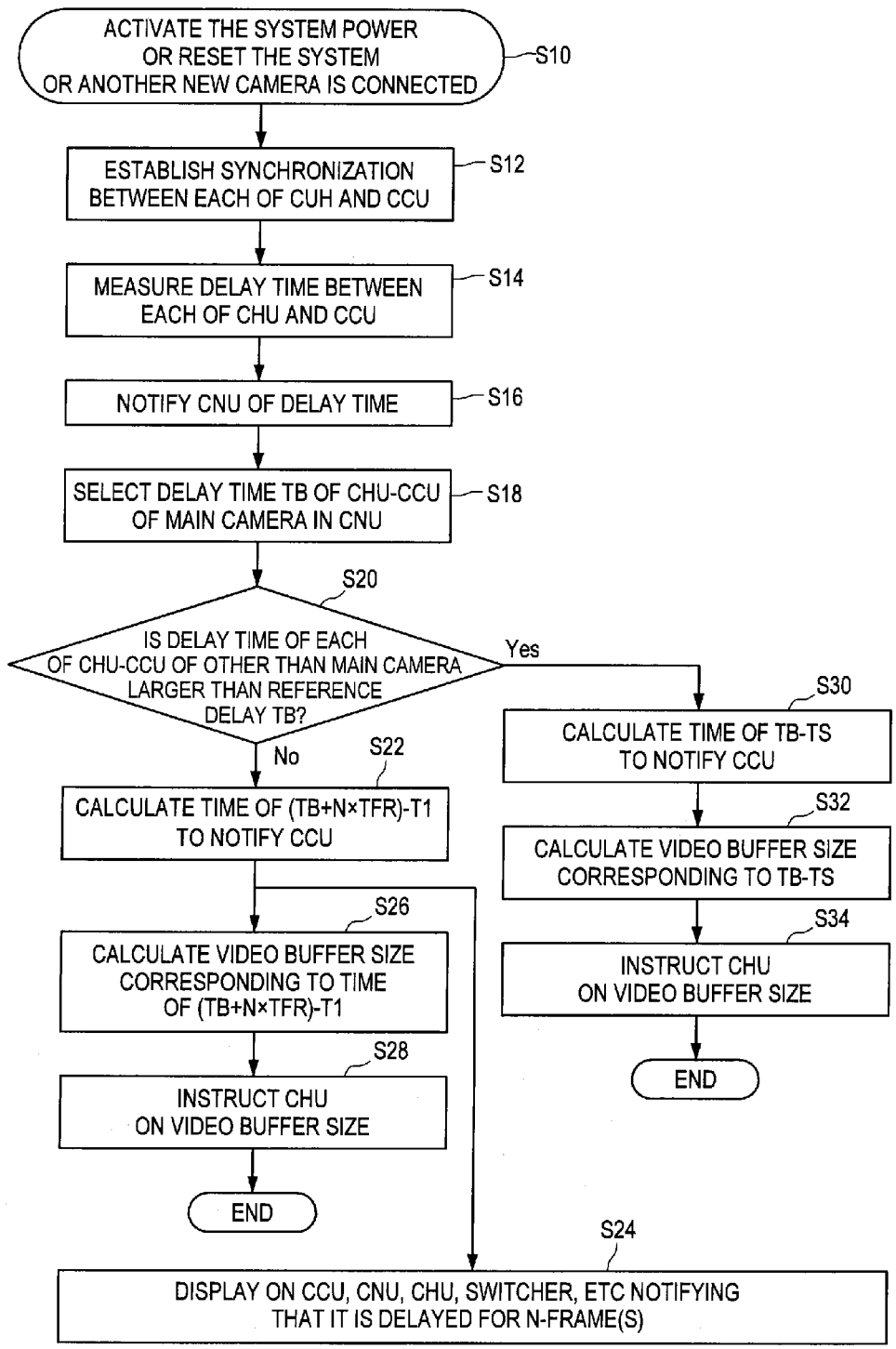
FIG. 8 is a flowchart for illustrating a procedure of the system according to the present embodiment.

FIG. 8 is a flowchart for illustrating a procedure of the system according to the present embodiment. A flow of processing from activating the system power or resetting the system to determining the video buffer will be explained as below. Here, as shown in FIG. 3 and FIG. 4, an explanation will be given on a case where the CNU 700 is set for arbitration.

Firstly, in step S10, activation of the system or resetting the system is performed. When a change is made in the configuration of the asynchronous transmission network 600 (the number of the switching hub 610, etc.), when a change is made in the number of CHU 200, or the like, a calibration is performed for a whole system by a system reset. In the subsequent step S12, synchronization is established between each of the CHU 200 and the CCU 300. In the subsequent step S 14, delay time is measured for each of the pair of the corresponding CHU 200 and CCU 300. Measuring the delay time can be performed along with establishing synchronization in step S12, using the method described in the Patent Literature 2 described above, the method of the IEEE1588, or the like. Specifically, the delay time is to be measured by comparing the timing of the video signal obtained in each of the CCU 300 and a reference pulse generated in the standard signal generator 500. In the subsequent step S16, each of the CCU 300 notifies the CNU 700 of the delay time. In the subsequent step S18, the CNU 700 selects the delay time Tb that has been notified from the CCU 300 corresponding to the CHU 200 which has been set up as a main camera in advance.

In the subsequent step S20, a determination is to be made on whether the delay time notified from each of the CCU 300 corresponding to each of the CHU 200 other than the main camera is larger than the delay time Tb selected in step S18.

If the delay time notified from each of the CCU 300 corresponding to each of the CHU 200 other than the main camera is larger than the delay time Tb in step S20, it proceeds to step S22. At this time, it is assumed that the delay time notified from each of the CCU 300 corresponding to the each of the CHU 200 other than the main camera is Tl. In step S22, the CNU 700 calculates a time (Tb+n*Tfr)−Tl, and notifies the CCU 300 of the calculated time. Here, each of the CCU 300 whose delay time is larger than the delay time Tb is to be notified of the time (Tb+n*Tfr)−Tl.

Subsequently, in step S26, the video buffer size corresponding to the time (Tb+n*Tfr)−Tl is to be calculated. In the subsequent step S28, the buffer size calculated in step S26 is to be transmitted to the corresponding CHU 200. Accordingly, the CHU 200 creates a buffer in the memory for accumulating video signals based on the indicated buffer size, and adjusts timing of the signals. Subsequently, as explained in FIG. 7, the delay amount of the CCU 300 whose delay time is Tl is to be adjusted to a state of being delayed for n-frames from the main camera. The processing will end after step S28.

Further, in step S24, information that there is a delay for n-frames is to be displayed in the CCU 300, the CNU 700, the CHU 200, the video switcher 400, or the like. At this time, the information that there is the delay for n-frames is transmitted from the CNU 700 to the CCU 300, the CHU 200, and the video switcher 400. Then, the CCU 300, the CHU 200, and the video switcher 400 perform a display based on the information that has been transmitted.

Moreover, in step S20, if the delay time is less than the delay time Tb that has been calculated in step S18, it proceeds to step S30. In step S30, time Tb−Ts is calculated to notify the CCU 300. Here, the time Tb−Ts is notified to each of the CCU 300 whose delay time is less than the delay time Tb. In the subsequent step S32, each of the CCU 300 calculates video buffer size corresponding to the time Tb−Ts. In the subsequent step S34, each of the CCU 300 instructs the buffer size calculated in step S32 to each of the CHU 200. The CHU 200 adjusts the timing of signals based on the buffer size. The processing will end after step S32. Subsequently, the CHU 200 creates a buffer in the memory for accumulating video signals based on the indicated buffer size, and adjusts timing of the signals. As explained in FIG. 6, this makes the delay amount of the CCU 300 whose delay time has been Ts adjusted to be matched with the reference delay amount Tb of the main camera. The processing will end after step S34.

Note that in the explanations described above, a video buffer that adjusts the delay amount is created in the CHU 200, however, the video buffer can be created in the CCU 300. Also, when the adjusting delay is performed in the CHU 200, the delay amount can be configured not by the buffer, but by the PLL phase regulation. Further, the adjusting delay can be realized using both a buffer and PLL phase regulation.

As described above, according to the present embodiment, it is possible to surely synchronize signals from each of the CHU 200 in a system which can make the transmission path simpler, reduce the cost, and develop a complex camera system with few wiring, by using the asynchronous transmission network. Therefore, it is possible to surely avoid distortion of video signals or audio signals when the video images that have been imaged in the each of the CHU 200 are switched. Further, using the asynchronous transmission network makes the flexibility in changing a camera network increased, and adapting a bus wiring makes the flexibility in wiring increased which leads to increase the flexibility in switching cameras and CCU. Further, by changing a destination address (IP address), it is possible to easily switch a camera (CHU 200) and the CCU 300.

A preferred embodiment of the present invention has been explained in detail above with reference to the attached drawings, the present invention is not limited to this example. It should be understood by those skilled in the art that various modifications, combinations, sub-combinations and alterations may occur depending on design requirements and other factors insofar as they are within the scope of the appended claims or the equivalents thereof.

The invention claimed is:

1. A method for adjusting one or more signal delays, comprising:
   obtaining delay amounts of video signals associated with respective camera units and respective camera control units, the camera units being coupled to respective ones of the camera control units via an asynchronous network;
   adjusting one or more of the delay amounts,
   wherein one of the delay amounts is selected as a reference delay amount and the other delay amounts are adjusted according to the reference delay amount, and wherein the other delay amounts are adjusted to be the same as the reference delay amount, or to be the same as the reference delay amount plus n frame periods, n being a positive integer that is greater than or equal to one; and
   for each other delay amount,
      determining whether or not the delay amount is greater than the reference delay amount;
      when the delay amount is less than the reference delay amount, adjusting the delay amount to be the same as the reference delay amount; and
      when the delay amount is greater than the reference delay amount adjusting the delay amount to be the same as the reference delay amount plus n frame periods, n being a positive integer that is greater than or equal to one.

2. A camera system, comprising:
   a plurality of camera units; and a plurality of camera control units coupled to respective ones of the camera units via an asynchronous network, the system being operable to obtain delay amounts of video signals associated with respective camera units and respective camera control units, and to adjust one or more of the delay amounts, wherein one of the delay amounts is selected as a reference delay amount and the other delay amounts are adjusted according to the reference delay amount, wherein the other delay amounts are adjusted to be the same as the reference delay amount, or to be the same as the reference delay amount plus n frame periods, n being a positive integer that is greater than or equal to one, and wherein for each other delay amount it is determined whether or not the delay amount is greater than the reference delay amount, and when the delay amount is less than the reference delay amount, the delay amount is adjusted to be the same as the reference delay amount, and when the delay amount is greater than the reference delay amount the delay amount is adjusted to be the same as the reference delay amount plus n frame periods, n being a positive integer that is greater than or equal to one.

3. A camera control unit coupled to a camera unit via an asynchronous network and being operable to obtain a delay amount of a video signal associated with the camera control unit and the camera unit, and to adjust the delay amount according to a reference delay amount, wherein the delay amount is adjusted to be the same as the reference delay amount, or to be the same as the reference delay amount plus n frame periods, n being a positive integer that is greater than or equal to one, and wherein a determination is made as to whether or not the delay amount is greater than the reference delay amount, and when the delay amount is less than the reference delay amount, the delay amount is adjusted to be the same as the reference delay amount, and when the delay amount is greater than the reference delay amount the delay amount is adjusted to be the same as the reference delay amount plus n frame periods, n being a positive integer that is greater than or equal to one.

* * * * *